(12) United States Patent
Savenok et al.

(10) Patent No.: US 12,069,330 B2
(45) Date of Patent: Aug. 20, 2024

(54) LOW LATENCY BROADCAST SYSTEM AND METHOD

(71) Applicants: Alexander Savenok, Grandview, MO (US); Jason Shore, Kansas City, MO (US)

(72) Inventors: Alexander Savenok, Grandview, MO (US); Jason Shore, Kansas City, MO (US)

( * ) Notice: Subject to any disclaimer, the term of this patent is extended or adjusted under 35 U.S.C. 154(b) by 70 days.

(21) Appl. No.: 17/515,062

(22) Filed: Oct. 29, 2021

(65) Prior Publication Data
US 2022/0141524 A1    May 5, 2022

Related U.S. Application Data

(60) Provisional application No. 63/107,293, filed on Oct. 29, 2020.

(51) Int. Cl.
| | |
|---|---|
| *H04N 21/43* | (2011.01) |
| *H04N 21/4363* | (2011.01) |
| *H04N 21/472* | (2011.01) |
| *H04N 21/482* | (2011.01) |
| *H04N 21/8352* | (2011.01) |

(52) U.S. Cl.
CPC . *H04N 21/43076* (2020.08); *H04N 21/43637* (2013.01); *H04N 21/47217* (2013.01); *H04N 21/4825* (2013.01); *H04N 21/8352* (2013.01)

(58) Field of Classification Search
CPC ....... H04N 21/43076; H04N 21/43637; H04N 21/47217; H04N 21/4825; H04N 21/8352
See application file for complete search history.

(56) References Cited

U.S. PATENT DOCUMENTS

| | | | | |
|---|---|---|---|---|
| 2014/0136833 A1* | 5/2014 | Kitze | ...................... | H04L 63/08 713/168 |
| 2017/0134831 A1* | 5/2017 | Talukder | ............... | H04N 21/242 |
| 2017/0332114 A1* | 11/2017 | Turgut | ............... | H04N 21/2187 |
| 2018/0041561 A1* | 2/2018 | Davies | .................. | H04L 65/762 |
| 2020/0359062 A1* | 11/2020 | Pantos | ............. | H04N 21/47217 |

FOREIGN PATENT DOCUMENTS

WO    WO-2017146700 A1 *    8/2017    ......... H04N 21/4222

* cited by examiner

*Primary Examiner* — Kyu Chae
(74) *Attorney, Agent, or Firm* — Christopher J. Scott

(57) ABSTRACT

The synthetic broadcast system and method according to the present invention contemplates a system of interactive devices within a wireless personal area network, near-me area network, or local area network, and at least one of which devices is configured to enable the user to generate audiovisual content and contribute the user-generated content to one or more virtual watch parties or synthetic broadcasts. A smart television and a mobile device together operate over a local area network or short-range wireless communication channel(s) to generate or parse the playback and routing instructions of state-of-the-art synthetic rebroadcast mechanisms. The system according to the present invention adds a novel mechanism for displaying real-time user generated video and audio content within the virtual watch parties attending to or consuming the content of the watch parties by way of the smart television and mobile device components.

10 Claims, 5 Drawing Sheets

LOW LATENCY BROADCAST SYSTEM AND METHOD

PRIOR HISTORY

This application claims the benefit of pending U.S. Provisional Patent Application No. 63/107,293 filed in the United States Patent and Trademark Office (USPTO) on 29 Oct. 2020, the specifications and drawings of which are hereby incorporated by reference thereto.

FIELD OF THE INVENTION

This invention generally relates to a system and method for providing a synthetic broadcast and more particularly relates to a system and method for enabling synthetic broadcasters and participants to generate and share audiovisual content within a closely held network environment.

SUMMARY OF THE INVENTION

Reference is firstly made to the following publications upon which the present specifications build and particularly with regard to the synthetic rebroadcast aspects thereof: US Patent Application Publication No. 2014/0164563; PCT Publication No. WO2015/164613; US Patent Application Publication No. 2017/0041280; US Patent Application Publication No. 2017/0124664; US Patent Application Publication No. 2019/0058685; US Patent Application Publication No. 2019/0058686; US Patent Application Publication No. 2019/0052594; and US Patent Application Publication No. 2019/0156435.

Building upon the synthetic broadcast/rebroadcast aspects of the foregoing publications, the system according to the present invention contemplates a system of interactive devices within a closely held computer network including, but not limited to, a wireless personal area network, near-me area network, or local area network, and at least one of which devices comprises means for enabling the user to generate audiovisual content and contribute the user-generated content to a virtual watch party or synthetic broadcast.

In a first preferred embodiment, a smart television and a mobile device such as a smart phone or tablet computer together operate over a local area network or short-range wireless communication channel(s) to generate or parse the playback and routing instructions. The system according to the present invention adds a novel mechanism for displaying real-time user generated video and audio content within the virtual watch parties or synthetic broadcasts, which user-generated video/audio content is attended to or consumed by way of the smart television and mobile device components.

A synthetic broadcast system and method enables synthetic broadcasters and synthetic broadcast participants to generate and share audiovisual content within a closely held network environment exemplified by a local area network. The synthetic broadcast system according to the present invention preferably comprises a computer network environment with at least two interactive computing devices each of which are outfitted with a non-transitory, computer-implementable software application.

The non-transitory, computer-implementable software application is firstly operable to enable a synthetic broadcaster to generate audiovisual content and share the generated audiovisual content with peripheral synthetic broadcast participants among the at least two interactive computing devices within the computer network environment. The synthetic broadcaster firstly joins a synthetic broadcast via a first computing device, and subsequently joins the same synthetic broadcast via a second computing device.

The non-transitory, computer-implementable software application is secondly operable to provide computer-implementable instructions for establishing a data communication channel and transitioning the synthetic broadcaster to a second device state associated with the second computing device. The synthetic broadcaster generates audiovisual content via the second computing device, and synthetically broadcasts at least a visual content portion of the audiovisual content upon the first computing device as delivered over the data communication channel.

The first computing device preferably displays primary user-generated visual content thereupon while the second computing device may preferably display multiple user-generated real-time visual content pieces. The second computing device is operable to output all real-time audio content in synchrony with the video output at the first computing device. An offset mechanism is preferably employed to ensure video content playback on the first computing device is synchronized to audio content playback on the second computing device.

A first select device, as selected from the group consisting of the first and second computing devices, receives a full set of both real-time audio/video data and is operable or configured to re-transmits a portion of that data to a second select device, as selected from the group consisting of the first and second computing devices. This arrangement helps to ensure that one device is solely responsible for packet synchronization.

The second computing device preferably provides play controls for controlling playback of primary user-generated content upon the first computing device. For example, the second computing device may preferably comprises a video content preview feature. The user-generated audiovisual content of a series of synthetic broadcast participants may be simultaneously output upon the first computing device. Real-time audio output may be preferably output on the second computing device while the user-generated audiovisual content of the series of participants is output upon the first computing device.

The first computing device may preferably send merged audio samples of full audio output to the second computing device. In this regard, it will be recalled the synthetic broadcast system according to the present invention preferably employs echo cancellation logic to prevent audio output from the first computing device from entering an audio input mechanism of the second computing device. Packet delivery latency is preferably calculated between the first and second computing devices, which packet delivery latency offsets audio output at the first computing device and offsets the application of echo cancellation logic at the second computing device.

In a second preferred embodiment, the present invention may be said to provide a low latency synthetic broadcast or watch party system for sharing user-generated content within a network environment. The synthetic broadcast system of the second preferred embodiment may be said to essentially comprise a broadcasting client, at least one watching or broadcast-receiving client, a remote service, and a non-transitory, computer-implementable software application implemented by the broadcasting client, the at least one broadcast-receiving client and the remote service.

The computer network environment enables a series of interactive computing devices, inclusive of the broadcasting client, each broadcast-receiving client, and the remote service, within the computer network environment to communicate with one another. The non-transitory, computer-implementable software application is operable or configured to establish a data communication channel between the broadcasting client and the remote service.

The broadcasting client sends unique identifier data associated with broadcasting content to the remote service via the data communication channel. The remote service stores the unique identifier data in a database. The broadcast-receiving client requests a low latency playlist from the remote service by way of the unique identifier data whereafter the remote service generates the low latency playlist from data associated with the unique identifier data and transmits the low latency playlist to the broadcast-receiving client.

Each broadcast-receiving client is configured to control quality and thus relative latency of playback requests. In this regard, it will be recalled that if a broadcast-receiving client were to request a low latency playlist in medium quality with audio, the remote service will fetch metadata about audio variants and the media quality and use this information in the playlist generation. Each broadcast-receiving client is further preferably configured to retrieve the unique identifier via a number of means, the number of means including a feed, a notification, a text message, via email, and similar other retrieval means.

The remote service generates a playlist comprising blank video content and silent audio content if the broadcast-receiving client requests the unique identifier when no content is being consumed. The broadcasting client is configured to update the remote service when a pause event occurs thereby providing a pause event update, the broadcasting client providing a location at which the pause event occurs, the remote service responding to the pause event update by generating a still fragment. The remote service fetches a still frame from the location at which the pause event occurs and generates a full frame with no audio, the full frame with no audio persisting until the broadcasting client changes playback state or position.

BRIEF DESCRIPTIONS OF THE DRAWINGS

Other features and objectives of the invention will become more evident from a consideration of the following brief descriptions of patent drawings.

Figure 3A:
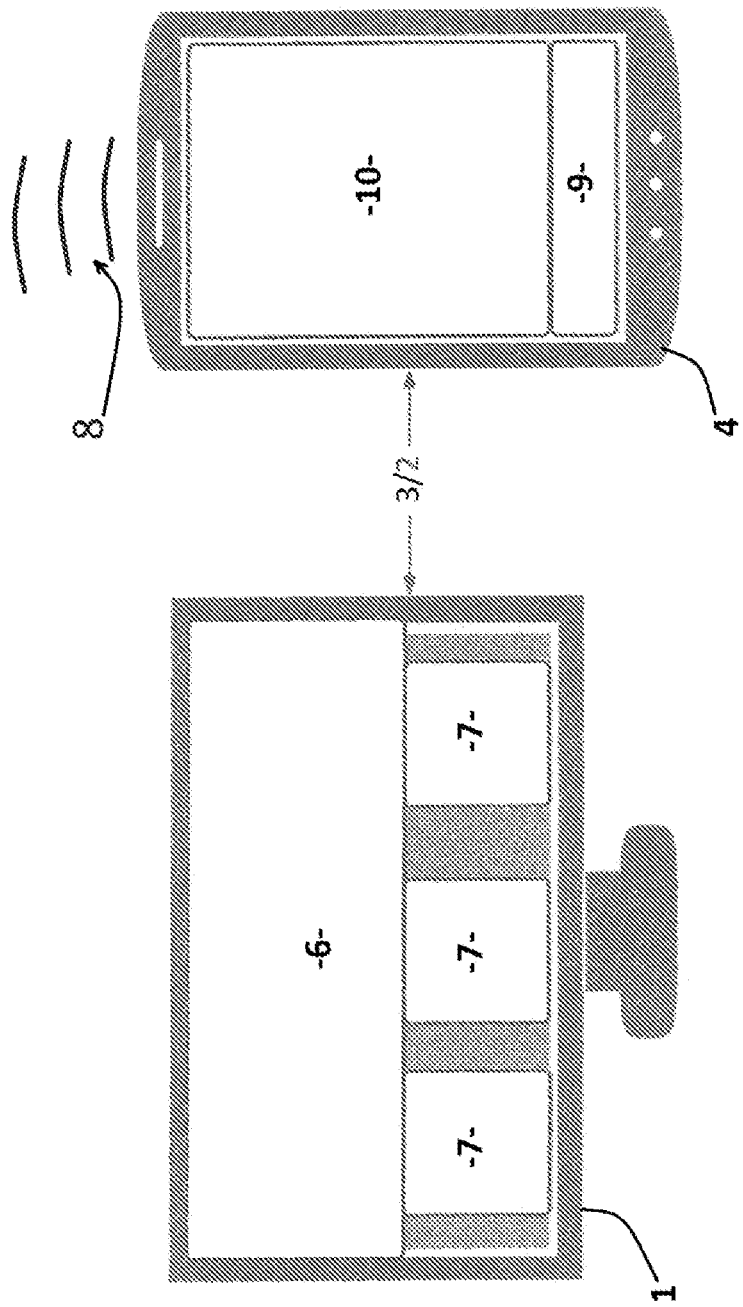
FIG. 3A is a third flowchart type diagram showing first and second computing devices in communication with one another within a closely held network environment to show a second variant of the first preferred embodiment the present invention whereby the second device outputs audio in synchrony with multiple visual outputs at the first device.
Figure 3B:
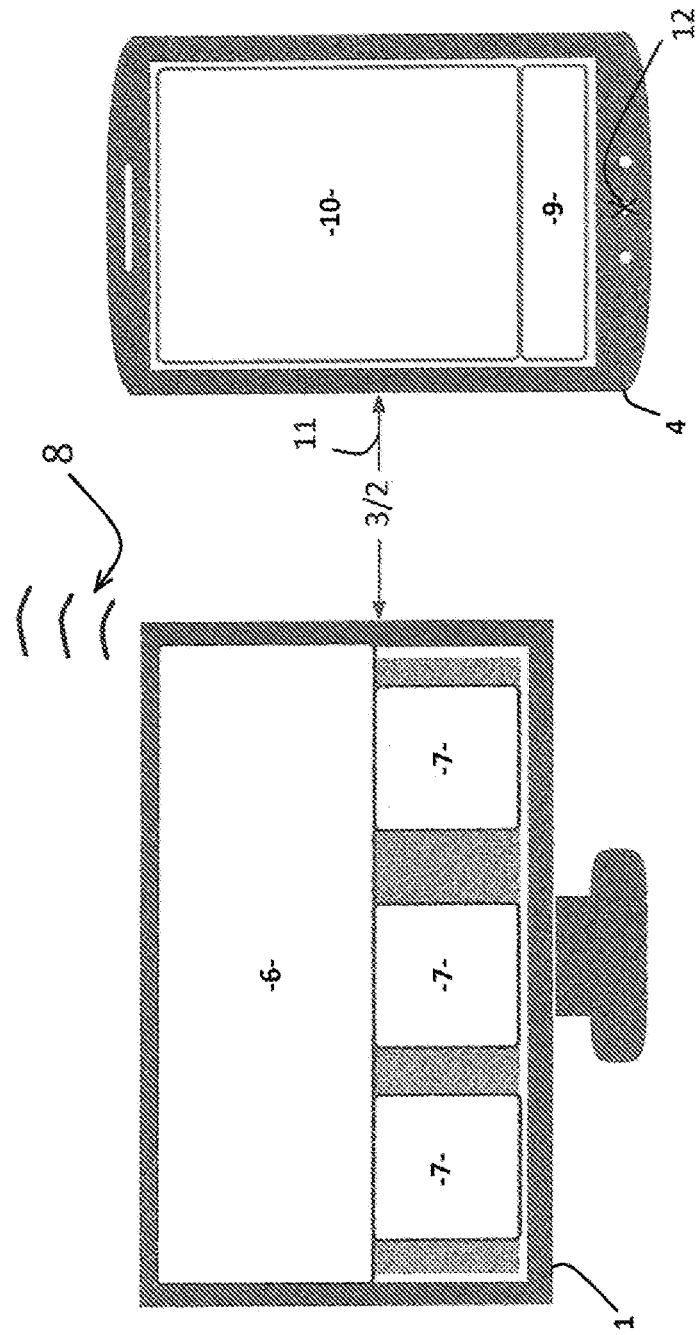

FIG. 3B is a fourth flowchart type diagram showing first and second computing devices in communication with one another within a closely held network environment to show the second variant of the first preferred embodiment the present invention whereby the first device outputs audio in synchrony with multiple visual outputs at the first device, and cancels audio output reception at the second device.

Figure 4:
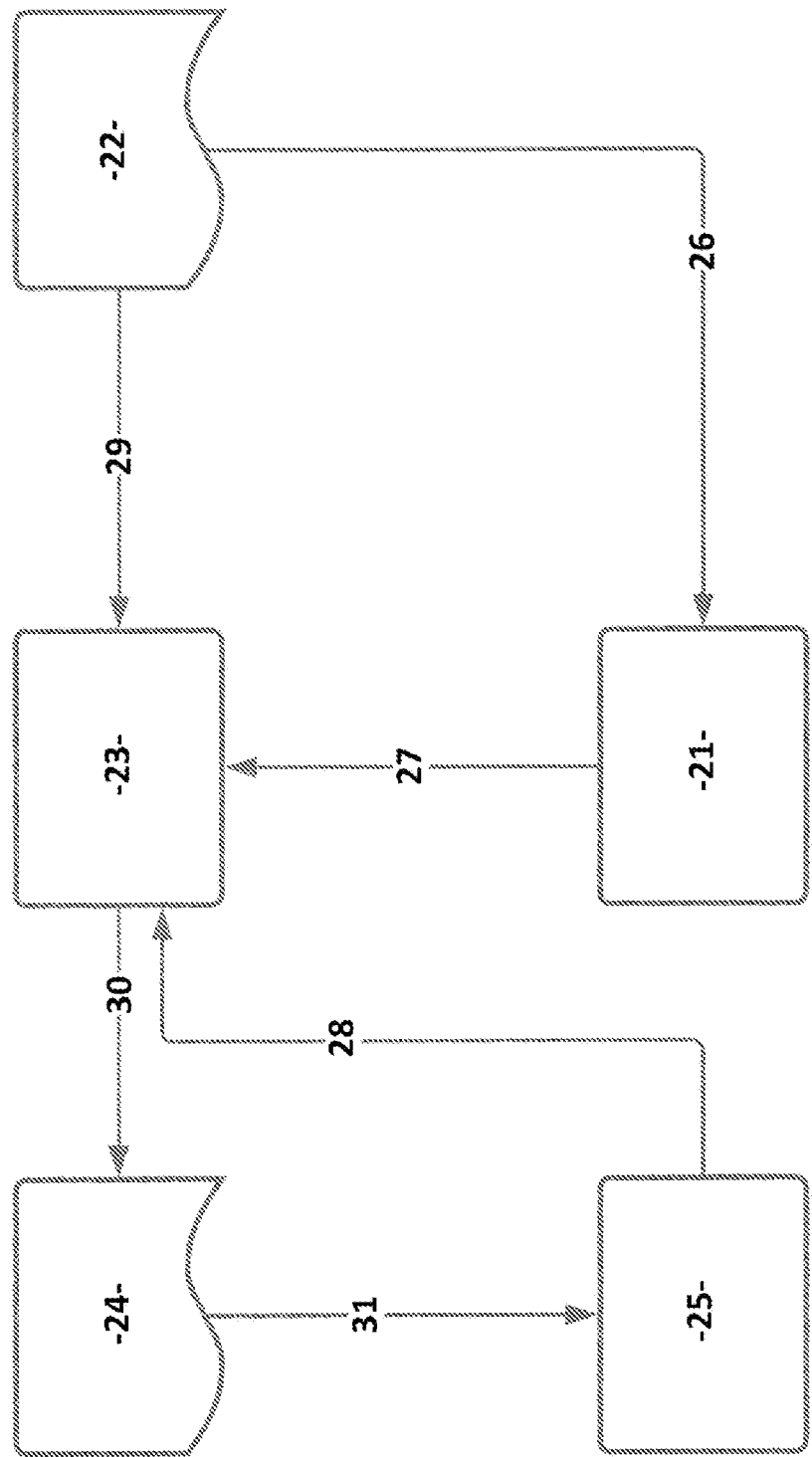

FIG. 4 is a fifth flowchart diagram showing an overview of a second preferred embodiment according to the present invention.

DETAILED DESCRIPTION OF THE PREFERRED EMBODIMENTS

Referencing FIGS. 1-3B, the reader will first consider there a first preferred embodiment according to the present invention. Within the system generally illustrated in FIGS. 1-3B, the end user or synthetic broadcaster would initially start or join a synthetic broadcast/virtual watch party via either a Smart Phone as at 4 or Smart Television as at 1 as a first computing device. Once the user or synthetic broadcaster has joined the synthetic broadcast/virtual watch party via the first computing device, the user subsequently joins the same synthetic broadcast or virtual watch party with the second computing device (Smart Television 1 or Smart Phone 4).

Preferably, both the first and second computing devices 1 and 4 are in communication as at 5 within the same local area network as at 3, or are alternatively in communication with one another via short range wireless communication protocols (e.g. Bluetooth, etc. as at 2). If both the first and second computing devices have the same user session/login information, the non-transitory transitory, computer-implementable mobile software application supporting the present invention will either prompt the user before transitioning to a second device state or automatically transition to the second device state. For purposes of descriptive ease, the Smart Phone 4 is the default second computing device and the Smart Television 1 is the default first computing device.

Within the second device state, the Smart Television 1 preferably displays the primary content as delivered over a primary content delivery communication channel. The primary content display area is depicted and referenced at 6. In this regard, it will be noted the computer-implementable media content-sharing systems according to the state of the art referenced above comprise and provide computer-implementable instructions for establishing an instruction-passing secondary channel to a consumer over an operable network; generating routing and playback instructions for governing playback of the consumable legally-protected media content via a content-delivery primary channel; and passing the routing and playback instructions to the consumer via the instruction-passing secondary channel for sourcing consumable legally-protected media content to the consumer from at least one legal access point. The present inventions depart from this layout such that a data communication channel is established from the broadcasting client to a remote service, which remote service generates a secondary playlist based on instructions received from the broadcasting client over this data communication channel.

It is noted the routing and playback instruction parsing and generation may be performed by either the first computing device (e.g. Smart Television 1 or Smart Phone 4) or the second computing device (e.g. Smart Phone 4 or Smart Television 1). It is contemplated, however, the preferred computing device for handling routing and playback instruction parsing and generation is the computing device that handles actual content playback (i.e. the Smart Television 1) in this case scenario.

Figure 1:
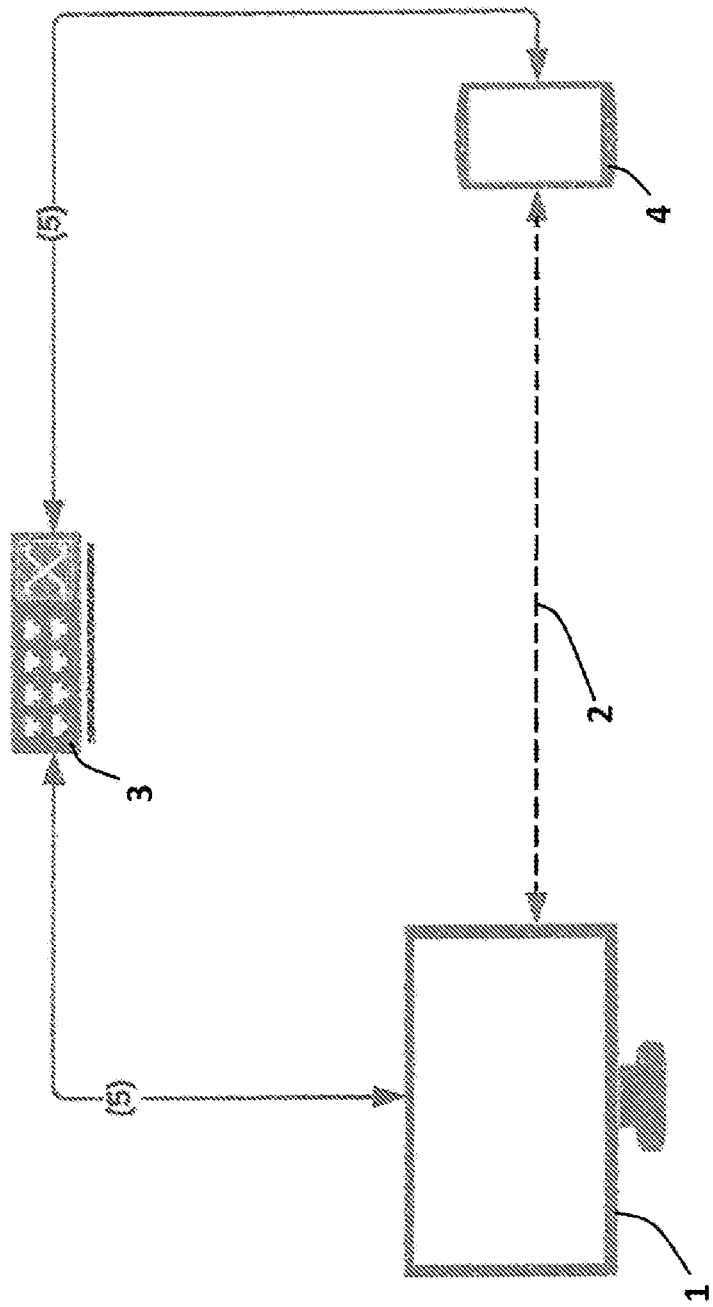
FIG. 1 is a first flowchart type diagram showing first and second computing devices in communication with a local area network according to a first preferred embodiment of the present invention.
Figure 2:
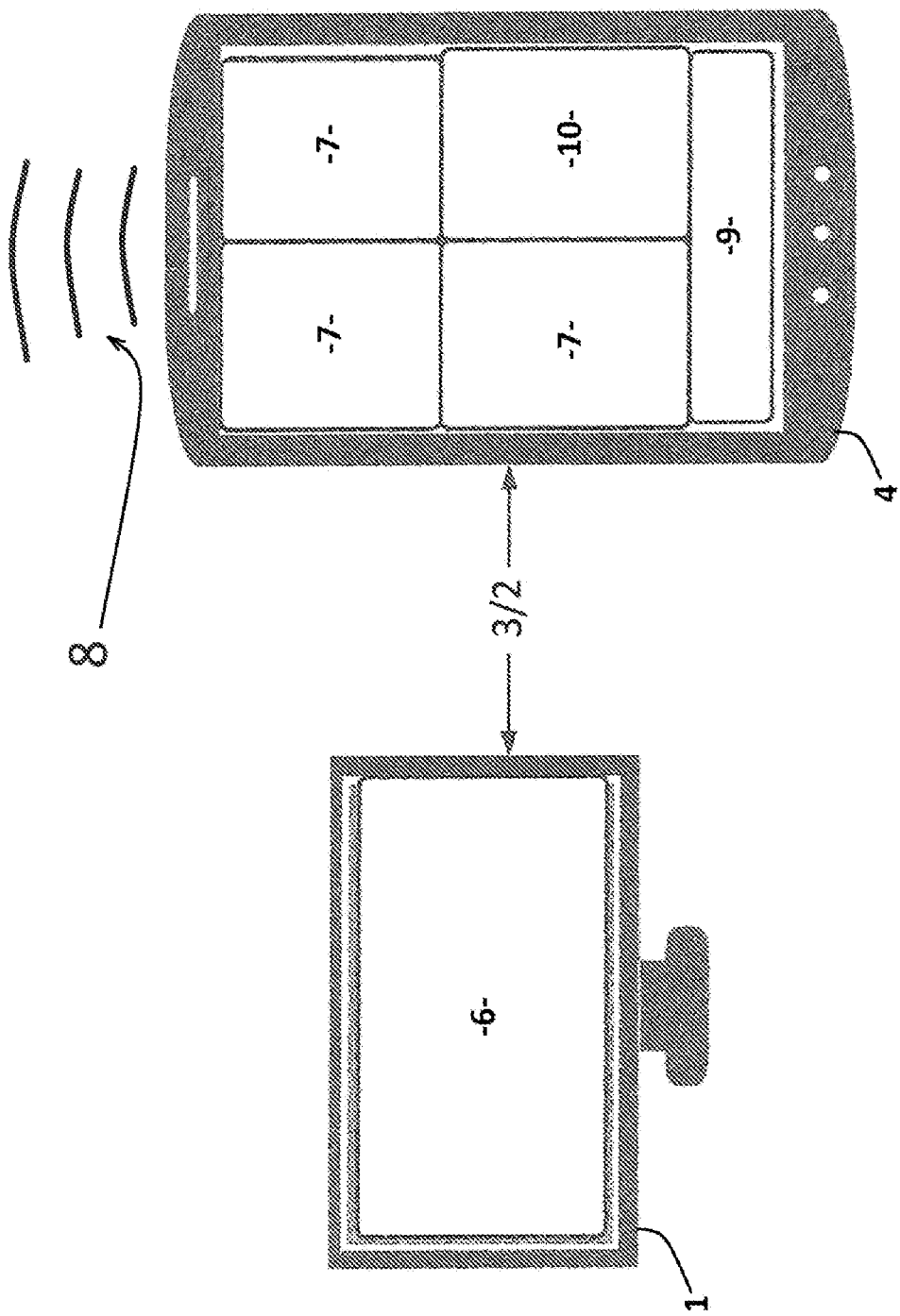
FIG. 2 is a second flowchart type diagram showing first and second computing devices in communication with one another within a closely held network environment to show a first variant of the first preferred embodiment of the present invention whereby the second device outputs audio in synchrony with the visual output at the first device.

Within the second device state, the system according to the present invention provides two possible variants. Variant 1 is generally depicted in FIG. 2 and Variant 2 is generally depicted in FIGS. 3A and 3B. Within Variant 1, the Smart Television 1 only handles the display of primary content upon the primary content display area as at 6, while the connected (via local area network 3 or short-range wireless protocols 2) mobile application operable upon the mobile device 4 exemplified by the Smart Phone operates to display multiple user real-time video content pieces as at 7, and outputs all real-time audio content as at 8.

The mobile device 4 preferably further comprises play controls as at 9 to control the playback of the primary content on the first computing device or Smart Television as at 1. The mobile device 4 or second screen device thus preferably communicates with and controls playback on the Smart Television 1 via the local area network 3 or short-range wireless communication channels 2, and may further preferably comprise a video recording preview feature as at 10.

In Variant 2, the primary audiovisual content comprising real-time video and audio content of other participants in the watch party is preferably output on the first computing device 1 exemplified by a Smart Television upon the primary content display area 6 with an option of having the real-time audio output 8 playable on the mobile device 4 exemplified by the Smart Phone as in FIG. 3A. If the Smart Television 1 plays the real-time audio track as at 8 in FIG. 3B, then the Smart Television 1 sends merged audio samples 11 of the full audio output 8 to the mobile device 4 over the local area network 3 or short-range wireless communication protocols 2. These audio samples 11 would be used within echo cancellation algorithms to remove as at X or reference numeral 12 the Smart Television 1 audio output 8 from the mobile device 4 microphone input.

In order to optimize echo cancellation, a packet delivery latency is preferably calculated between the two computing devices 1 and 4. The packet deliver latency is then utilized to offset the audio playout 8 of the audio packets on the Smart Television 1, and offset the application of the echo cancellation logic on the mobile device or Smart Phone 4. If the mobile device 4 handles the real-time audio playout 8, then the offset is not used to offset the application of the echo cancellation algorithm, but to offset the video and audio playout so that video on the Smart Television 1 is synchronized to audio playout 8 on the mobile device 4. In the case that audio and video playout is split across the two computing devices, only one of the devices actually receives the full set of real-time video/audio data, and re-transmits the video/audio data to the second device over LAN or short-range wire communication protocols 3 or 2. This ensures that one device is solely responsible for packet synchronization.

Referencing FIG. 4, the reader will there consider a second preferred embodiment of a low latency watch party system according to the present invention. The watch party system generally illustrated in FIG. 4 envisions a system in which low latency HLS or similar other technologies are used to replicate the content viewing and playback progression of another broadcasting client 21 utilizing playback events, and a remote service 23 is able to process the events and generate a low latency playlist 24 from the original content, and the playback events.

The low latency watch party system and process begins with a broadcasting client as at 21 initiating as at 27 a broadcast session of some sort using some means of unique identification. The broadcasting client 21 is capable of locating and playing as at 26 media content exemplified by video and/or audio content 22. As a user utilizes the broadcasting client 21, the client 21 generates events that contain some identifying information about the original stream that would inform the remote service 23 where the content data may be located. This may be either an URL to the original content, or a reference to the content. The information also contains the playback position of the broadcasting client 21 within the original content 22, and the playback state (e.g. playing-paused-stopped-empty).

This data is then transmitted to the remote service 23 over a data communication channel as at 27 established between the remote server/service 23 and the broadcasting client 21. The remote service 23 stores the playback events in a database to utilize in a process of low latency playlist 24 generation generally referenced at directional arrows 29, 30, and 31. The watching client 25 joins the session 31 by requesting as at 28 the low latency playlist 24 (it can be an MPEG-DASH, LLHLS, or similar format) using the unique identifier when the session was created as at 27. The unique identifier may be retrieved by the watching client 25 in a multiplicity of ways, as for example through a feed, notifications, a text message, through email and similar other means.

When the remote service 23 receives this request 28 it uses the events associated with the session, to retrieve fragment data and other stream meta-data as at 29. This data is fragmented URI, stream quality, and stream variant(s). For example, if the watching client 25 requested to view the low latency playlist 24 in medium quality with audio, the remote service 23 would fetch the metadata about the audio variant and the media quality video variant of the original playlist, which is necessary to locate the URI's of the media quality video fragments, and audio fragments, that are used in the playlist generation process 30.

The remote service 23 uses the playlist data, along with the events data to generate a low latency playlist 24 for the watching client 25. If the watching client 25 joined the watch party when no content was being watched, the remote service 23 simply generates a playlist filled with blank video frames and silent audio. If a pause event were to occur, the broadcasting client 21 would inform the remote service 23 at which location in the stream a pause occurred, so that the remote service 23 may generate a still fragment. A still fragment is generated by taking the video frame at the pause position in the original stream 22, and generating a full frame with no audio. This frame fills the playlist as the session progresses, until the broadcasting client 21 changes playback state or position.

The second preferred embodiment has several advantages over directly broadcasting from a client. Firstly, the second preferred embodiment minimizes data consumption, and increases the video and audio transmission quality. In order to achieve low latency with broadcasts directly from a client, one would have to use a low latency protocol like webrtc, or rtmp, or rtsp. In all cases, the resulting quality of video transmission would be significantly lower. The system also provides quick content load, and responsiveness to broadcaster events, which is a shortcoming of a 2-channel system in which playback events are transmitted directly to the consuming client along with the primary content for stream generation.

While the invention has been illustrated and described in detail in the drawings and foregoing description, the same is to be considered as illustrative and not restrictive in character, it being understood that only preferred embodiments have been shown and/or described and that all changes and modifications that come within the spirit of the invention are desired to be protected. In a first preferred embodiment, the present invention may be said to essentially provide a synthetic broadcast system and method for sharing user-generated content within a closely held network environment. The synthetic broadcast system according to the present invention preferably comprises a computer network environment with at least two interactive computing devices each of which are outfitted with a non-transitory, computer-implementable software application.

The non-transitory, computer-implementable software application is firstly operable to enable a synthetic broadcaster to generate audiovisual content and share the generated audiovisual content with peripheral synthetic broadcast participants among the at least two interactive computing devices within the computer network environment. The synthetic broadcaster firstly joins a synthetic broadcast via a first computing device, and subsequently joins the same synthetic broadcast via a second computing device.

The non-transitory, computer-implementable software application is secondly operable to provide computer-implementable instructions for establishing a data communication channel and transitioning the synthetic broadcaster to a second device state associated with the second computing device. The synthetic broadcaster generates audiovisual content via the second computing device, and synthetically broadcasts at least a visual content portion of the audiovisual content upon the first computing device as delivered over the content-delivery channel.

The first computing device preferably displays primary user-generated visual content thereupon while the second computing device may preferably display multiple user-generated real-time visual content pieces. The second computing device is operable to output all real-time audio content in synchrony with the video output at the first computing device. An offset mechanism is preferably employed to ensure video content playback on the first computing device is synchronized to audio content playback on the second computing device.

A first select device, as selected from the group consisting of the first and second computing devices, receives a full set of both real-time audio/video data and is operable or configured to re-transmits a portion of that data to a second select device, as selected from the group consisting of the first and second computing devices. This arrangement helps to ensure that one device is solely responsible for packet synchronization.

The second computing device preferably provides play controls for controlling playback of primary user-generated content upon the first computing device. For example, the second computing device may preferably comprises a video content preview feature. The user-generated audiovisual content of a series of synthetic broadcast participants may be simultaneously output upon the first computing device. Real-time audio output may be preferably output on the second computing device while the user-generated audiovisual content of the series of participants is output upon the first computing device.

The first computing device may preferably send merged audio samples of full audio output to the second computing device. In this regard, it will be recalled the synthetic broadcast system according to the present invention preferably employs echo cancellation logic to prevent audio output from the first computing device from entering an audio input mechanism of the second computing device. Packet delivery latency is preferably calculated between the first and second computing devices, which packet delivery latency offsets audio output at the first computing device and offsets the application of echo cancellation logic at the second computing device.

In a second preferred embodiment, the present invention may be said to provide a synthetic broadcast system for sharing user-generated content within a network environment. The synthetic broadcast system of the second preferred embodiment may be said to essentially comprise a computer network environment, a broadcasting client, at least one watching client, a remote service, and a non-transitory, computer-implementable software application implemented by the broadcasting client, the at least one watching client and the remote service.

The computer network environment enables a series of interactive computing devices, inclusive of the broadcasting client, each watching client, and the remote service, within the computer network environment to communicate with one another. The non-transitory, computer-implementable software application is operable or configured to establish a data communication channel between the broadcasting client and the remote service.

The broadcasting client sends unique identifier data associated with broadcasting content to the remote service via the data communication channel. The remote service stores the unique identifier data in a database. The watching client requests a low latency playlist from the remote service by way of the unique identifier data whereafter the remote service generates the low latency playlist from data associated with the unique identifier data and transmits the low latency playlist to the watching client.

Each watching client is configured to control quality of playback requests. In this regard, it will be recalled that if a watching client were to request a low latency playlist in medium quality with audio, the remote service will fetch metadata about the audio variant and the media quality video and use this information in the playlist generation. Each watching client is further preferably configured to retrieve the unique identifier via a number of means, the number of means including a feed, a notification, a text message, via email, and similar other retrieval means.

The remote service generates a playlist comprising blank video content and silent audio content if the watching client requests the unique identifier when no content is being consumed. The broadcasting client is configured to update the remote service when a pause event occurs thereby providing a pause event update, the broadcasting client providing a location at which the pause event occurs, the remote service responding to the pause event update by generating a still fragment. The remote service fetches a still frame from the location at which the pause event occurs and generates a full frame with no audio, the full frame with no audio persisting until the broadcasting client changes playback state or position.

Accordingly, although the invention has been described by reference to certain preferred embodiments, and certain associated methodologies, it is not intended that the novel arrangement and methods be limited thereby, but that modifications thereof are intended to be included as falling within the broad scope and spirit of the foregoing disclosures and the appended drawings. Insofar as the description above and the accompanying drawings disclose any additional subject matter that is not within the scope of the claims below, the embodiments are not dedicated to the public and the right to file one or more applications to claim such additional embodiments is reserved.

What is claimed is:

1. A low-latency broadcast system for sharing user-generated content within a network environment, the broadcast system comprising:
 a broadcasting client, at least one broadcast-receiving client, a remote service, and a non-transitory, computer-implementable software application implemented by the broadcasting client, the at least one broadcast-receiving client and the remote service within a computer network environment;

the non-transitory, computer-implementable software application being operable to establish communication between the broadcasting client and the remote service and communication between the at least one broadcast-receiving client and the remote service, the broadcasting client sending unique identifier data associated with broadcast content created by the broadcasting client to the remote service, the remote service storing the unique identifier data in a database as a primary playlist;

the at least one broadcast-receiving client requesting a secondary low-latency playlist from the remote service by way of the unique identifier data, the remote service generating the secondary low latency playlist from data associated with the unique identifier data and transmitting the secondary low latency playlist to the at least one broadcast-receiving client;

the remote service being configured to generate an empty playlist comprising blank video content and silent audio content if the at least one broadcast-receiving client requests the secondary low latency playlist when no broadcast content is being consumed by the broadcasting client.

2. The low-latency broadcast system of claim 1 wherein the at least one broadcast-receiving client is configured to control latency of playback requests by controlling quality parameters of the broadcast content.

3. The low-latency broadcast system of claim 1 wherein the at least one broadcast-receiving client is configured to retrieve the unique identifier via a number of means, the number of means including a feed, a notification, a text message, and an email.

4. The low-latency broadcast system of claim 1 wherein the broadcasting client is configured to update the remote service when a pause event occurs thereby providing the remote service with a pause event update, the broadcasting client providing a location at which the pause event occurs, the remote service responding to the pause event update by generating a still fragment at the location at which the pause event occurs.

5. The low-latency broadcast system of claim 4 wherein the remote service fetches a still frame from the location at which the pause event occurs and generates a full frame with no audio, the full frame with no audio persisting until the broadcasting client changes playback state or position.

6. A low-latency broadcast method for sharing user-generated content within a network environment, the broadcast method comprising the steps of:

outfitting a broadcasting client, at least one broadcast-receiving client, and a remote service with a non-transitory, computer-implementable software application implemented by the broadcasting client, the at least one broadcast-receiving client and the remote service within a computer network environment;

the non-transitory, computer-implementable software application establishing communication between the broadcasting client and the remote service and between the at least one broadcast-receiving client and the remote service;

sending unique identifier data associated with broadcast content created by the broadcasting client to the remote service, the remote service storing the unique identifier data in a database as a primary playlist;

requesting a secondary low-latency playlist from the remote service by way of the unique identifier data from the at least one broadcast-receiving client; [and] transmitting the secondary low latency playlist to the at least one broadcast- receiving client; and generating an empty playlist by the remote service comprising blank video content and silent audio content if the at least one broadcast-receiving client requests the secondary low latency playlist when no broadcast content is being consumed by the broadcasting client.

7. The low-latency broadcast method of claim 6 wherein the at least one broadcast-receiving client controls latency of playback requests by controlling quality parameters of the broadcast content.

8. The low-latency broadcast method of claim 6 wherein the at least one broadcast-receiving client retrieves the unique identifier via a number of means, the number of means including a feed, a notification, a text message, and an email.

9. The low-latency broadcast method of claim 6 wherein the broadcasting client updates the remote service when a pause event occurs thereby providing the remote service with a pause event update, the broadcasting client providing a location at which the pause event occurs, the remote service responding to the pause event update by generating a still fragment at the location at which the pause event occurs.

10. The low-latency broadcast method of claim 9 wherein the remote service fetches a still frame from the location at which the pause event occurs and generates a full frame with no audio, the full frame with no audio persisting until the broadcasting client changes playback state or position.

* * * * *